United States Patent [19]

Swan et al.

[11] Patent Number: 4,656,242

[45] Date of Patent: Apr. 7, 1987

[54] POLY(ESTER-AMIDE) COMPOSITIONS

[75] Inventors: Dale G. Swan, St. Louis Park; Jerry C. Hansen, Bloomington, both of Minn.

[73] Assignee: Henkel Corporation, Minneapolis, Minn.

[21] Appl. No.: 742,254

[22] Filed: Jun. 7, 1985

[51] Int. Cl.$^4$ .............................................. C08G 63/54
[52] U.S. Cl. .................................. 528/295.3; 528/288; 528/295.5; 528/289
[58] Field of Search .................... 528/288, 295.3, 295.5

[56] References Cited

U.S. PATENT DOCUMENTS

| | | | |
|---|---|---|---|
| 3,397,816 | 8/1968 | Ess et al. ........................ | 528/295.3 X |
| 4,207,217 | 6/1980 | Guainazzi et al. ............ | 528/295.3 X |
| 4,307,227 | 12/1981 | Meyer et al. .................... | 528/288 |
| 4,397,991 | 8/1983 | Drawert et al. ............. | 528/295.3 X |
| 4,485,233 | 11/1984 | Veazey .............................. | 528/295.3 |

Primary Examiner—Lucille M. Phynes
Attorney, Agent, or Firm—Ernest G. Szoke; Patrick J. Span

[57] ABSTRACT

A certain class of poly(ester-amide) polymers are disclosed which are particularly suitable as hot melt adhesive compositions particularly advantageous for bonding plastics, such as polyester or polycarbonate polymers. The particular class of poly(ester-amides) are those which include a polymeric fat acid, and more specifically a dimeric fat acid component, in which the ester segments will contribute from about 20, preferably 35 to about 60 weight percent of the poly(ester-amide) and the amide segment contributing the remainder.

10 Claims, No Drawings

POLY(ESTER-AMIDE) COMPOSITIONS

This invention relates to a certain class of poly(ester-amide) polymers which are particularly suitable as hot melt adhesive compositions particularly advantageous for bonding plastics, such as polyester or polycarbonate polymers. The particular class of poly(ester-amides) are those which include a polymeric fat acid and more specifically a dimeric fat acid component in which the ester segments will contribute from about 20, preferably 35 to about 60 weight percent of the poly(ester-amide) and the amide segment contributing the remainder.

BACKGROUND OF THE INVENTION

Poly(ester-amide) adhesive compositions have been known for some time in the art, including the use as hot melt adhesives for various substrates such as metals, wood and plastics. Included in this background of poly(ester-amide) compositions are U.S. Pats. Nos. 3,650,999, 4,343,743, and 4,485,233. Each of these three patents may include a polymeric fat acid component. U.S. Pat. No. 3,650,999, related to poly(ester-amide) compositions, is generally useful as adhesives to a variety of substrates such as steel, aluminum, wood and plastic substrates. By the proper selection of reactants and using special polymerization techniques, a block copolymer poly(ester-amide) composition was prepared having certain advantages in high temperature properties over earlier adhesive compositions. However, the products do not possess good low temperature properties. The block copolymer is a composition comprising from 30 to 70% by weight crystalline polyester segments and 70 to 30% of amorphous polyamide segments. The polyesters employed were high melting crystalline polyesters of aromatic acids and glycols and copolyesters thereof, which provided polyester segments having melting points in the range of 180° to 270° C.

U.S. Pat. No. 4,343,743 deals with copoly(ester-amides) having a random, alternately or regularly recurring block structure in which the improvement over U.S. Pat. No. 3,650,999 is alleged as providing products having a glass transition temperature below −30° C. so that the polymers remain pliable down to temperatures of that level. However, the products do not possess good heat fail properties. As disclosed in this patent, the proportion by weight of polyester segments is preferably between 50 and 80% by weight although a general range of 20 to 80% is disclosed.

U.S. Pat. No. 4,485,233 relates to poly(ester-amide) compositions which include a polymeric fat acid component and which are indicated as employing diamines and diols which contain a high proportion of non-hydrogen bonding groups or an odd number of carbon atoms to provide advantageous crystallization properties which permit long open assembly times. Within the general requirement that substantially equivalent amounts of carboxyl and amine groups be present in the reaction mixture provide a neutral or balanced poly(ester-amide), the proportions of the reactants are 10 to 60 equivalent percent of the polymeric fatty acid, 40 to 90 equivalent percent of another dicarboxylic acid, 40 to 90 equivalent percent of a diamine and 10 to 60 equivalent percent of a diol.

SUMMARY OF THE INVENTION

It has been discovered that a particular class of poly(ester-amide) compositions employing a polymeric fat acid component have particularly good adhesive properties, especially in relation to the bonding of plastics such as polyesters or polycarbonates, and in particular where such substrates are required to be bonded to metals particularly protected metals, such as tinplate and galvanized steel. Thus the poly(ester-amides) of the present invention are particularly useful in trilamination of polyester materials to aluminum such as a Mylar-/aluminum/Mylar laminate. Further the products are particularly useful in bonding polycarbonate aerodynamic headlamps for automobiles.

The products of this invention possess an overall desirable combination of both high and low temperature properties in addition to their advantageous adhesive properties. The most desirable products of this invention will possess a Ball and Ring softening point greater than about 150° C., a heat fail temperature of greater than 120° C. and a flexibility such as to pass a ⅛" mandrell at −20° F.

The poly(ester-amides) of this invention which find utility in the above noted application areas are those generally using the proportions and amounts of reactants found in the earlier references noted above with the amounts, however, being so selected and adjusted so as to provide a final poly(ester-amide) polymer having from about about 20, preferably 35 to about 60 weight percent polyester segments based on the total weight of polymer with the remainder being the amide segments. The product is preferably a random copolymer prepared under the usual condensation reaction conditions for preparation of poly(ester-amides) by reacting an acid component comprising (a) from 10 to 80 and preferably to 60 equivalent percent of the polymeric fat acid, and
(b) from 20, preferably 40, to 90 equivalent percent of a linear dicarboxylic acid;

with a substantially equivalent amount of an amine and diol component comprising (c) from 40 to about 90, and preferably 50–80 equivalent percent of an organic diamine and
(d) 10, or preferably 40, to 60 equivalent percent of a diol.

DETAILED DESCRIPTION OF THE INVENTION

As indicated above, the poly(ester-amide) compositions of this invention are prepared from the reactants noted using the amounts and adjusting the proportions of the reactants so as to provide a final polymer in which the polyester segments comprise from about 20, preferably 35 to about 60 weight percent of the total weight of polymer with the polyamide forming of the balance of the polymer. The reactants employed to prepare the poly(ester-amide) compositions of the invention are old and well known as are the methods preparation of the poly(ester-amide) compositions. The techniques and general method of forming the polymer are the usual condensation reaction conditions for forming polyamides. In general these conditions are reaction at temperatures at about 100° to 300° C. for a sufficient time to effect poly(ester-amide) formation. In general the reactions may be initially heated to a temperature of about 125° or 130° to 150° or 160° C. to initiate polymerization and thereafter at higher temperatures sufficient to distill off the water of condensation. Illustrative of such higher temperatures are temperatures of about 200–250 and quite generally 210°–235° C. The reaction is generally carried out by charging the resin reactor kettle with the reactants in the proportions desired and heating to the temperature at which random polymerization occurs. Random polymerization occurs by charging all of the reactants at one time in contrast to block polymerization in which case at least one and preferably both the polyester and polyamides are preformed and subsequently reacted with the other polymer or the corresponding reactants. The products of the present invention may be random polymers or block copolymers. In some cases the block copolymers provide a more desirable combination of high temperature properties associated with low temperature properties.

The polymeric fatty or fat acids also sometimes referred to in the art as "dimer acids" are products resulting from the polymerization of fatty acids. The polymeric fat acids are well known and a summary of the preparation of such acids is found in U.S. Pat. No. 3,157,681. Commercially available polymeric fat acids generally are prepared from polymerization of tall oil fatty acids which will generally have a composition as follows:

|  | Percent by Weight |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

Polymeric fat acids having a higher dimeric fat acid content in excess of 65% by weight and preferably in excess of 90 or 95% by weight are obtained by fractionation by suitable means such as high vacuum distillation to provide very high purity products having a dimeric fat acid content in the order of 98–99%. There will be less than 1% monomer and/or trimer.

A more detailed description and summary of the preparation of polymeric fat acids can be found in U.S. Pat. No. 3,377,303 and the description therein is incorporated herein by reference.

A wide variety of dicarboxylic acids may also be employed along with the polymeric fat acids and the preparation of a compositions of this invention. The dicarboxylic compounds employed in the present invention are the aliphatic or cycloaliphatic hydrocarbon compounds, preferably those of the formula:

ROOC—COOR or ROOCR$_1$COOR where R is selected from the group consisting of hydrogen or alkyl groups containing from 1–8 carbon atoms and R$_1$ is a divalent aliphatic hydrocarbon (preferably straight chain), or cycloaliphatic, radical having from 1 to 20 and preferably 4 to 12 carbon atoms. The preferred esters are the alkyl esters having from 1–4 carbon atoms, the most preferred being the methyl or ethyl esters. The dicarboxylic acids preferably are those containing at least 6 carbon atoms up to about 12 carbon atoms. Illustrative of the dicarboxylic compounds are oxalic, malonic, glutaric, adipic, succinic, suberic, azelaic, sebacic, dodecanedioic and pimelic acids. Such dicarboxylic acids are well known, readily available commercially, with adipic, azelaic and sebacic the most common.

The organic diamines, which are employed in the present invention, are preferably the aliphatic or cycloaliphatic diamines having from about 2 to 20 carbon atoms. Especially preferred are the alkylene diamines, such as ethylene diamine, diaminopropane, diaminobutane, and hexamethylene diamine. Ideally, these preferred diamines are represented by the formula H$_2$NR$_2$NH$_2$ where R$_2$ is an aliphatic, (preferably straight chain) or cycloaliphatic hydrocarbon radical having from 2–20 carbon atoms. Heterocyclic diamines such as piperazine may also be employed. The most preferred of the alkylene diamines is hexamethylene diamine which provides the most desirable overall combination of properties.

Diols employed in the invention are also generally well known compounds also available commercially. Representative of the preferred diols are the straight chain aliphatic, or cycloaliphatic diols having from 2–20, and preferably 2–6 carbon atoms such as ethylene glycol, 1,3-propylene glycol, 1,4-butylene glycol, neopentyl glycol and 1,6-hexamethylene glycol. These may be ideally represented by the formula HOR$_1$OH where R$_1$ is as earlier defined. Ether diols such as polyoxyethylene glycol may be employed in which one R$_1$ will also contain an oxygen atom.

The following examples will serve to best illustrate the spirit and scope of the present invention. These examples are not to be construed as limiting, but illustrations of the invention. Percentages and parts are by weight unless otherwise indicated. Also for convenience and illustration, the polymeric fat or fatty acid employed in the examples are polymerized tall oil fatty acids except where otherwise noted.

EXAMPLES

Example 1

Typical Preparation Procedure

The reactants are placed in the reactor which is sealed and a nitrogen sweep is employed to remove any air as heating and stirring begin. Venting is begun when the pressure reaches about 100–120 psig. or when temperature reaches 230° C. When the pressure reaches atmospheric or 0 psig., the temperature is maintained at about 230° C. while sweeping with nitrogen for one hour. The reactor is slowly evacuated to about 10 mm. with a nitrogen sweep. Vacuum is then broken with nitrogen and the resin product is removed from the reactor.

Example 2

A poly(ester-amide) was prepared following the typical procedure from the following charge:

| Material | Weight | Equivalents | Equivalents % In Product |
|---|---|---|---|
| *Polymerized tall oil acid | 626 | 2.2 | 25 |
| Adipic acid | 161 | 2.2 | 25 |
| Hexamethylene Diamine (70% solution) | 220 | 2.64 | 30 |
| Ethylene glycol (excess) | 109 | 3.52 | 20 |
| Zinc acetate - 2H$_2$O | 1.0 | | |
| Antimony oxide (Sb$_2$O$_5$) | 0.1 | | |
| Triphenyl phosphate | 2.0 | | |
| Antifoamant (Dow Corning Antifoam A) | 10 drops | | |

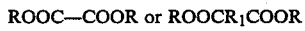*Versadyme ® 288 polymerized tall oil fatty acids having typical specification:
Acid Value 197–201

| % Monomer (M) | 1.5 max |
|---|---|
| % Intermediate (I) | 3.5 max |

| | |
|---|---|
| % Dimer (D) | 90.0 min |
| % Trimer (T) | 5.0 max |

In the foregoing the zinc acetate, antimony oxide and triphenyl phosphite are esterification catalysts, the triphenyl phosphite also serving as an antioxidant. The resulting product contains about 37% by weight of ester segments and about 63% amide segments. On an equivalent basis the product contains 25 equivalent percent of polymerized tall oil fatty acids, 25 equivalent percent adipic acid, 30 equivalent percent hexamethylene diamine and 20 equivalent percent ethylene glycol. The product had the following properties:

| | |
|---|---|
| Acid No. | 32.0 meg/Kg |
| Amine No. | 44.8 meg/Kg |
| OH No. | 169.0 meg/Kg |
| Ball & Ring Softening Point | 198° C. |
| Inherent Viscosity | 0.534 |
| Yield Point (psi) | 845 |
| Ultimate tensile Strength (psi) | 1450 |
| % Elongation | 556 |

Example 3

In the same manner as Example 2, a polyester-amide was prepared with the materials below to provide a product having 47% by weight ester segments and 53% amide segments.

| Material | Weight (grams) | Equivalents | Equivalent % In Product |
|---|---|---|---|
| Polymerized tall oil acid (Same as Example 2) | 684 | 2.400 | 30 |
| Adipic acid | 117 | 1.600 | 20 |
| Hexamethylene diamine | 165 | 1.987 | 25 |
| (70% solution) Ethylene glycol | 123 | 4.000 | 25 |
| Zinc acetate - 2H$_2$O | 1.0 | | |
| Antimony oxide | 0.1 | | |
| Triphenyl phosphite | 2.0 | | |
| 0.1% Dow Corning Antifoam A | 10 drops | | |

The products had the following properties:

| | |
|---|---|
| Acid No. | 16.1 meg/Kg |
| Amine No. | 50.6 meg/Kg |
| OH No. | 174.9 meg/Kg |
| Ball & Ring Softening Point | 159° C. |
| Inherent Viscosity | 0.539 |
| Yield Point (psi) | 470 |
| Ultimate tensile Strength (psi) | 730 |
| % Elongation | 650 |

Examples 4–16

Several other polyester-amide resins were similarly prepared, the amounts and results thereof which can be seen from the following Table I. In all cases the ethylene glycol was used in a 100% excess. The equivalents of each component in the final polymer is as shown in the Table.

TABLE I

| Ex. | Eq. in Final Polymer D/A/H/E | Wt. % Polyester Seg. | Acid # | Amine # | Ball & Ring softening Point °C. | Brookfield Visc. 220° C. (poise) | Tensile YP (psi) | Strength UTS (psi) | 2% Moduless (psi) | Elongation % | Heat Fail °C. |
|---|---|---|---|---|---|---|---|---|---|---|---|
| 4 | 25/25/30/20 | 37 | 1.1 | 1.2 | 185 | 100 | 780 | 1420 | 14,100 | 650 | 179 |
| 5 | 30/20/25/25 | 47 | 1.3 | 0.9 | 168 | 400 | 700 | 1900 | 9,500 | 900 | 155 |
| 6 | 30/20/25/25* | 47 | 3.2 | 0.4 | 194 | 250 | 610 | 760 | 8,000 | 310 | — |
| 7 | 30/20/25/25** | 47 | 0.8 | 1.0 | 170 | 40 | 620 | 690 | 10,900 | 410 | 153 |
| 8 | 25/25/25/25 | 47 | 0.8 | 1.0 | 179 | 300 | 750 | 2000 | 14,000 | 865 | 165 |
| 9 | 10/40/20/30 | 56 | 0.4 | 0.9 | 185 | 60 | 1140 | 1300 | 25,000 | 280 | 172 |
| 10 | 40/10/20/30 | 58 | 0.7 | 1.0 | 127 | 75 | 430 | 520 | 5,300 | 1065 | 85 |
| 11 | 20/30/40/10 | 18 | 4.8 | 1.0 | 199 | 400 | 1320 | 3000 | 24,700 | 460 | 184 |
| 12 | 30/20/25/25 | 47 | 2.8 | 0.8 | 165 | 160 | 620 | 1350 | 10,200 | 900 | 143 |
| 13 | 30/20/25/25 | 47 | 2.2 | 1.1 | 168 | 75 | — | 1500 | 9,800 | 870 | 150 |
| 14 | 30/20/25/25 | 47 | 5.8 | 0.6 | 161 | 20 | 600 | 600 | 10,000 | 450 | 125 |
| 15 | 30/20/25/25 | 47 | 3.3 | 1.1 | 166 | 12 | 640 | 560 | 12,300 | 240 | 123 |
| 15 | 25/25/35/15 | 28 | 1.3 | 1.1 | 200 | 480 | 975 | 2700 | 17,000 | 660 | 192 |
| Comparative A (Ex. 3 of U.S. Pat. No. 3,650,999) | | 60 | 7.1 | 0.7 | 196 | 64 | 510 | 1720 | 15,000 | 455 | 194 |
| Comparative B (Ex. 1 of U.S. Pat. No. 3,650,999) | | 30 | 5.5 | 1.0 | 177 | 60 | 760 | 945 | 6,500 | 385 | 145 |
| Comparative C (Ex. 3 of U.S. Pat. No. 4,343,743 - block polymer) | | 75 | 1.0 | 1.3 | 142 | 17 | — | — | — | — | 115 |
| Comparative D (Ex. 3 of U.S. Pat. No. 4,343,743 - random polymer) | | 75 | 1.0 | 1.0 | 118 | 35 | — | — | — | — | 86 |

Notes:
D = Polymerized tall oil acids of Ex. 1;
A = Adipic acid;
H = Hexamethylene diamine;
E = Ethylene glycol;
*made as block copolymer - adipic acid/hexamethylene diamine block formed first
**Polymerized tall oil acids - Versadyme ® 204 having typical analysis % M 10.9; % I 5.3; % D 71.1; % T 12.6;

In the foregoing Table I, the amine and acid members are determined by conventional titration analysis. The heat fail temperature is the temperature at which a one square inch lap bond between Kraft paper fails under a three pound load using a temperature rate of 5° C./10 minutes. The other values were determined as indicated below:

| | |
|---|---|
| Ball & Ring Softening Point (B & R) - Tensile Strength | ASTM 28-58 T |
| YP - | ASTM D-1708 |
| UTS - | ASTM D-1708 |
| Modulus | ASTM D-638 |
| Elongation | ASTM D-1708 |

In the following Table II, the adhesive properties, glass transition temperatures and flexibility of the products are shown. The adhesive properties were determined by measurement of T-peel strength determined by ASTM D-1876-72 on tin plate (TP), aluminum (AL), Mylar (M) and aluminum to Mylar (AL/M). Except where otherwise indicated the bonding temperature was 220° C. The glass transition temperatures were determined by ASTM D-4065-82 and flexibility was determined by a mandrel bend test at temperature of Room Temperature (72° F.), 0° F., and −20° F. by test method ASTM D-3111-76, with Pass (P) and Failure (F) as indicated.

Examples 17 and 18

In order to illustrate further the adhesive properties of the products of the invention two lots of the resin of Example 3 having 47% polyester segments were prepared and evaluated with the following results of Table III. Adhesive results with other examples are also shown.

TABLE III

| | Example 17 | Example 18 | Example 4 | Example 5 | Example 7 | Example 12 | Example 15 | Example 16 |
|---|---|---|---|---|---|---|---|---|
| Heat Fail Temp., °C. | 150 | 150 | 179 | 155 | 153 | 143 | 123 | 192 |
| Tensile Shear, psi (ASTM D 1002) | | | | | | | | |
| Steel | 550 | 1005 | | 805 | 825 | 775 | 665 | |
| Aluminum | 830 | 1085 | | 1430 | 835 | 1270 | 715 | |
| "T" Peel, lb/in | | | | | | | | |
| Tinplate | 33 | 41 | 34 | | | | | 28 |
| Aluminum | 6 | 8 | | | | | | |
| Vinyl | 4 | 5 | | | | | | |
| Mylar | 2 | 1 | | | | | | |
| 180° Peel, lb/in* (ASTM D 903) | | | | | | | | |
| ABS | 22 | 28 | | 30 | 13 | 26 | 15 | |
| Acrylic | 14 | 20 | | 8 | 2 | 6 | 5 | |
| Noryl | 21 | 31 | | 23 | 13 | 30 | 15 | |
| Nylon 6,6 | 18 | 27 | | 23 | 6 | 18 | 15 | |
| Polycarbonate | 21 | 27 | | 20 | 13 | 22 | 14 | |
| XMC | 19 | 21 | 32 | 18 | 11 | 16 | 14 | 22 |
| Aluminum | 21 | 27 | | 11 | 6 | 17 | 15 | |
| Bond. Steel | 21 | 31 | | 34 | 14 | 29 | 17 | |
| Galv. Steel | 17 | 29 | 27 | 30 | 3 | 23 | 14 | 52 |

*Canvas was used as the flexible substrate

From the foregoing description and experimental data, it can be seen that the poly(ester-amide) products of the present invention exhibit unique properties including high heat resistance combined with low temperature flexibility while having good adhesion to a variety of substrates including plastic substrate, such as polyesters and polycarbonates. The products are particularly suitable for trilamination bonding of polyethylene terephthate (Mylar) and aluminum i.e. Mylar-/aluminum/Mylar. Polycarbonates are in current use in automotive applications such as aerodynamic headlamps. The products of this invention are particularly useful in such automotive applications where bonding of polycarbonates to their substrates is desired.

What is claimed is:

TABLE II

| | T-Peel Pounds/Inch | | | | Tg | Flexibility - Mandrel Bend Test | | | | | | | | |
|---|---|---|---|---|---|---|---|---|---|---|---|---|---|---|
| | | | | | | RT | | | 0° F. | | | −20° F. | | |
| Example | TP | AL | M | AL/M | °C. | 1/2" | 1/4" | 1/8" | 1/2" | 1/4" | 1/8" | 1/2" | 1/4" | 1/8" |
| 4 | 34 | — | — | — | * | P | → | → | → | → | → | → | → | P |
| 5 | 35 | 9 | — | — | −24 | P | → | → | → | → | → | → | → | P |
| 6 | 20 | 4.7 | 5.3*** | 7.4 | −32 | P | → | → | → | → | → | → | → | P |
| 7 | — | — | — | — | −26 | P | → | → | → | → | → | → | → | P |
| 8* | 27 | 6.4 | 5.4*** | 4.6 | −26 | P | → | → | → | → | → | → | → | P |
| 9 | 13 | 6.8 | — | 4.3 | −31 | P | → | → | → | → | → | → | → | P |
| 10** | 26 | 4.9 | 8.6 | 7.3 | −34 | P | → | → | → | → | → | → | → | P |
| 11 | 13 | 3.9 | — | 4.5*** | +5 | P | → | → | → | → | → | → | → | P |
| 12 | 33 | 8 | — | — | — | P | → | → | → | → | → | → | → | P |
| 13 | 41 | 7 | 5 | — | — | P | → | → | → | → | → | → | → | P |
| 14 | 29 | 7 | — | — | — | P | → | → | → | → | → | → | → | P |
| 15 | — | — | — | — | — | P | → | → | → | → | → | → | → | P |
| 16 | 28 | — | — | — | — | P | → | → | → | → | → | → | → | P |
| Comp. A | 2 | 2.8 | 4.7*** | 1.9 | +18 | P | P | P | F | → | → | → | → | F |
| Comp. B | 4 | 4.3 | — | — | +14 | P | P | P | F | → | → | → | → | F |
| Comp. C | — | — | — | — | −42 | P | → | → | → | → | → | → | → | P |
| Comp. D | — | — | — | — | −39 | P | → | → | → | → | → | → | → | P |

*Bonding Temp. 200° C.
**Bonding Temp. 180° C.
***Mylar Failure

1. A poly(ester-amide) composition which comprises the product of polymerization of
   (a) from about 10 to 80 equivalent percent of a polymeric fatty acid and
   (b) from about 20 to 90 equivalent percent of a dicarboxylic acid,
with a substantially equivalent amount of
   (c) from about 40 to 90 equivalent percent of an organic diamine and
   (d) from about 10 to 60 equivalent percent of a diol
wherein the amount of the reactants are selected and adjusted so as to provide a polymer containing from about 20 to 60 percent by weight of ester segments, the remainder of said segments being amide.

2. A composition as defined in claim 1 wherein said dicarboxylic acid has the formula $$ROOC-COOR \text{ or } ROOCR_1COOR$$

where R is selected from the group consisting of hydrogen and alkyl groups having 1-8 combination and $R_1$ is a divalent aliphatic or cycloaliphatic hydrocarbon radical having 1-20 carbon atoms.

3. A composition as defined in claim 1 wherein said dicarboxylic acid is a straight chain aliphatic diacid and has at least six carbon atoms.

4. A composition as defined in claim 3 wherein said diacid has from 6-12 carbon atoms.

5. A composition as defined in claim 4 wherein said diacid is selected from the group consisting of adipic, azelaic and sebacic acids.

6. A composition as defined in claim 1 wherein the organic diamine has the formula $$H_2N\ R_2NH_2$$

where $R_2$ is an aliphatic or cycloaliphatic hydrocarbon radical containing from 2-20 carbon atoms.

7. A composition as defined in claim 6 wherein said organic diamine is hexamethylene diamine.

8. A composition as defined in claim 1 wherein said diol has the formula $$HO-R_1-OH$$

where $R_1$ is an aliphatic or cycloaliphatic hydrocarbon radical having from 1-20 carbon atoms.

9. A composition as defined in claim 8 wherein said diol is ethylene glycol.

10. A composition as defined in claim 8 wherein said diol is 1,6 hexamethylene diol.

* * * * *